United States Patent
Li et al.

(10) Patent No.: US 8,891,207 B1
(45) Date of Patent: Nov. 18, 2014

(54) CONNECTION SCHEMES FOR A MULTIPLE SENSOR ARRAY USABLE IN TWO-DIMENSIONAL MAGNETIC RECORDING

(71) Applicant: Western Digital (Fremont), LLC, Fremont, CA (US)

(72) Inventors: Shaoping Li, San Ramon, CA (US); Gerardo A. Bertero, Redwood City, CA (US); Michael L. Mallary, Sterling, MA (US); Ge Yi, San Ramon, CA (US); Steven C. Rudy, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/963,172

(22) Filed: Aug. 9, 2013

Related U.S. Application Data

(60) Provisional application No. 61/832,267, filed on Jun. 7, 2013.

(51) Int. Cl.
| | |
|---|---|
| *G11B 5/10* | (2006.01) |
| *G11B 5/29* | (2006.01) |
| *G11B 5/39* | (2006.01) |
| *G11B 5/115* | (2006.01) |

(52) U.S. Cl.
CPC .................................... *G11B 5/115* (2013.01)
USPC ............ 360/316; 360/319; 360/322; 360/121

(58) Field of Classification Search
USPC .......................... 360/316, 319, 322, 323, 121
See application file for complete search history.

(56) References Cited

U.S. PATENT DOCUMENTS

| | | | |
|---|---|---|---|
| 4,012,781 A | 3/1977 | Lin | |
| 5,229,901 A | 7/1993 | Mallary | |
| 5,270,892 A | 12/1993 | Naberhuis | |
| 5,309,305 A | 5/1994 | Nepela et al. | |
| 5,388,014 A | 2/1995 | Brug et al. | |
| 5,539,598 A * | 7/1996 | Denison et al. | 360/323 |
| 5,684,658 A | 11/1997 | Shi et al. | |
| 5,696,654 A | 12/1997 | Gill et al. | |
| 5,721,008 A | 2/1998 | Huang et al. | |
| 5,796,535 A | 8/1998 | Tuttle et al. | |
| 5,831,888 A | 11/1998 | Glover | |
| 5,963,400 A | 10/1999 | Cates et al. | |
| 6,071,007 A | 6/2000 | Schaenzer et al. | |
| 6,104,562 A | 8/2000 | Ottesen et al. | |
| 6,154,335 A | 11/2000 | Smith et al. | |
| 6,157,510 A | 12/2000 | Schreck et al. | |
| 6,191,925 B1 | 2/2001 | Watson | |
| 6,216,242 B1 | 4/2001 | Schaenzer | |
| 6,271,998 B1 | 8/2001 | Coehoorn et al. | |
| 6,311,551 B1 | 11/2001 | Boutaghou | |
| 6,362,528 B2 | 3/2002 | Anand | |

(Continued)

*Primary Examiner* — Jefferson Evans

(57) ABSTRACT

A method and system provide a magnetic transducer including first and second read sensors, a shield and a conductive via. The shield is between the first and second read sensors. In one aspect, the magnetic transducer also includes first and second read shields. In this aspect, the first read shield has a read shield aperture. The conductive via extends through the read shield aperture, provides electrical contact to the shield and is insulated from the first read shield. In another aspect, the shield has first and second shield layers separated by an insulating layer. In this aspect, the second shield layer has an aperture therein. The conductive via extends through this aperture, provides electrical contact to the first shield layer and is insulated from the second shield layer.

28 Claims, 8 Drawing Sheets

(56) References Cited

U.S. PATENT DOCUMENTS

| | | |
|---|---|---|
| 6,449,131 B2 | 9/2002 | Guo et al. |
| 6,496,333 B1 | 12/2002 | Han et al. |
| 6,674,618 B2 | 1/2004 | Engel et al. |
| 6,842,312 B1 | 1/2005 | Alstrin et al. |
| 6,861,756 B2 | 3/2005 | Saito et al. |
| 6,888,253 B1 | 5/2005 | Rogers et al. |
| 7,106,549 B2 | 9/2006 | Asakura |
| 7,193,807 B1 | 3/2007 | Liikanen et al. |
| 7,259,927 B2 | 8/2007 | Harris |
| 7,271,970 B2 | 9/2007 | Tsuchiya |
| 7,315,072 B2 | 1/2008 | Watanabe |
| 7,369,358 B2 * | 5/2008 | Edelman et al. .......... 360/125.01 |
| 7,372,168 B2 | 5/2008 | Wu et al. |
| 7,400,474 B2 * | 7/2008 | Biskeborn et al. ............ 360/323 |
| 7,405,907 B2 | 7/2008 | Raastad |
| 7,408,730 B2 | 8/2008 | Yamagishi |
| 7,436,632 B2 | 10/2008 | Li et al. |
| 7,868,362 B2 | 1/2011 | Randazzo et al. |
| 8,130,473 B2 * | 3/2012 | Hachisuka .................... 360/316 |
| 8,139,301 B1 | 3/2012 | Li et al. |
| 8,208,228 B2 | 6/2012 | Maat et al. |
| 8,310,782 B2 * | 11/2012 | Song et al. .................... 360/121 |
| 8,384,220 B2 | 2/2013 | Saito et al. |
| 2002/0131217 A1 * | 9/2002 | Nakashio et al. .......... 360/324.2 |
| 2003/0151855 A1 * | 8/2003 | Molstad et al. ................ 360/316 |

* cited by examiner

CONNECTION SCHEMES FOR A MULTIPLE SENSOR ARRAY USABLE IN TWO-DIMENSIONAL MAGNETIC RECORDING

CROSS-REFERENCE TO RELATED APPLICATIONS

This application claims priority to provisional U.S. Patent Application Ser. No. 61/832,267, filed on Jun. 7, 2013, which is hereby incorporated by reference in its entirety.

BACKGROUND

FIG. 1 depicts an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures 16. These magnetic bias structures are used to magnetically bias the sensor layer of the sensor 14.

Although the conventional magnetic recording transducer 10 functions, there are drawbacks. In particular, the conventional magnetic recording transducer 10 may not function adequately at higher recording densities. Two-dimensional magnetic recording (TDMR) technology may enable significantly higher recording densities. In TDMR, multiple read sensors are used. These sensors are longitudinally distributed along the cross track direction but are aligned in the down track direction. The sensors are separated by a particular distance in the cross track direction. In addition, the sensors have the same length (and read track width) in the cross track direction. This length is typically not more than fifty percent of the track width. The central sensor reads the data from a track of interest, while the outer sensors sense the data in adjacent tracks in order to account for noise.

Although TDMR might be capable of higher recording densities, issues may be faced at skew. For example, in some recording applications, such as shingled recording, the skew angle changes. Near the outside diameter of the disk, the skew angle may be positive. Closer to the center of the disk (the inside diameter of the disk), the skew angle may be negative. Between the inside and outside diameters, the skew angle may be zero. For nonzero skew angle(s), some of the recording sensors may be moved so that they are misaligned with the track they are desired to sense. This is generally an issue for the outer read sensors. As a result, the transducer may not perform as desired for all skew angles. In addition, providing electrical connection to the sensors may be challenging. Accordingly, what is needed is a system and method for improving the performance of a magnetic recording read transducer, particular for TDMR.

DETAILED DESCRIPTION OF THE EXEMPLARY EMBODIMENTS

Figure 1:
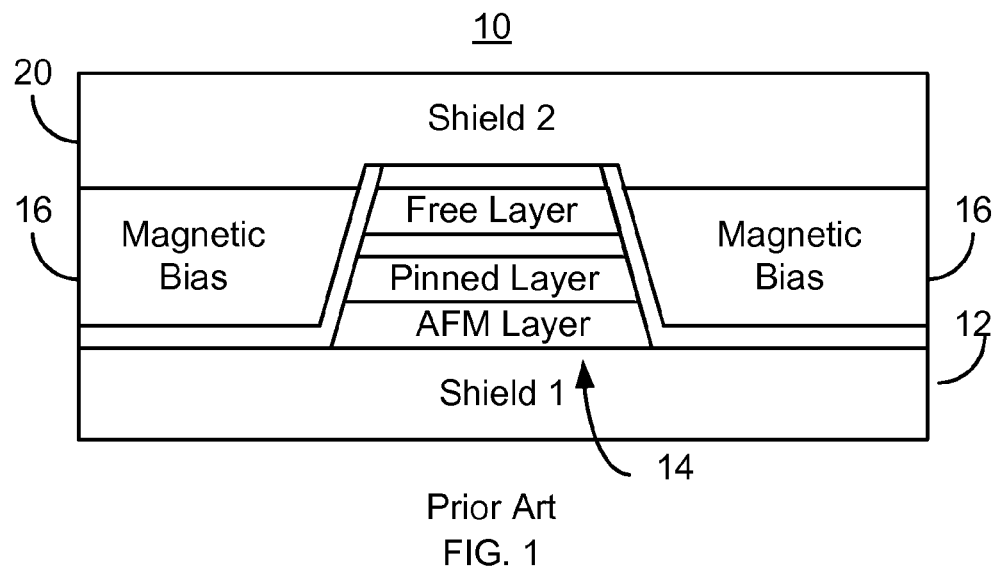
FIG. 1 depicts a conventional read transducer.
Figure 2:
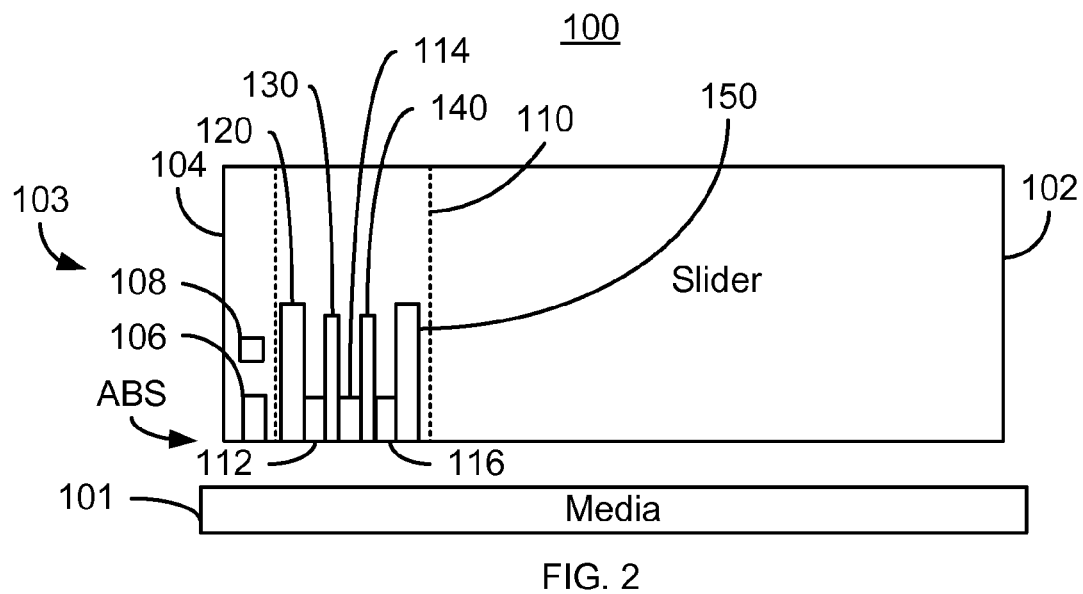
FIG. 2 depicts an exemplar embodiment of a disk drive.
Figure 3:
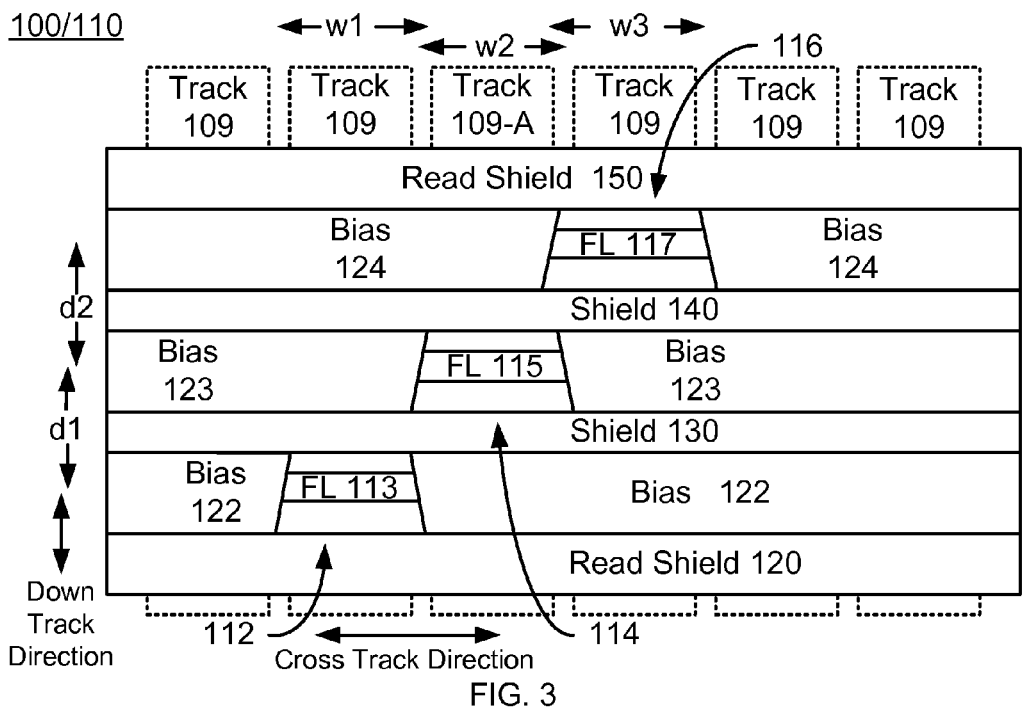
FIG. 3 depicts an ABS view exemplary embodiment of a portion of a magnetic recording read transducer.
Figure 4:
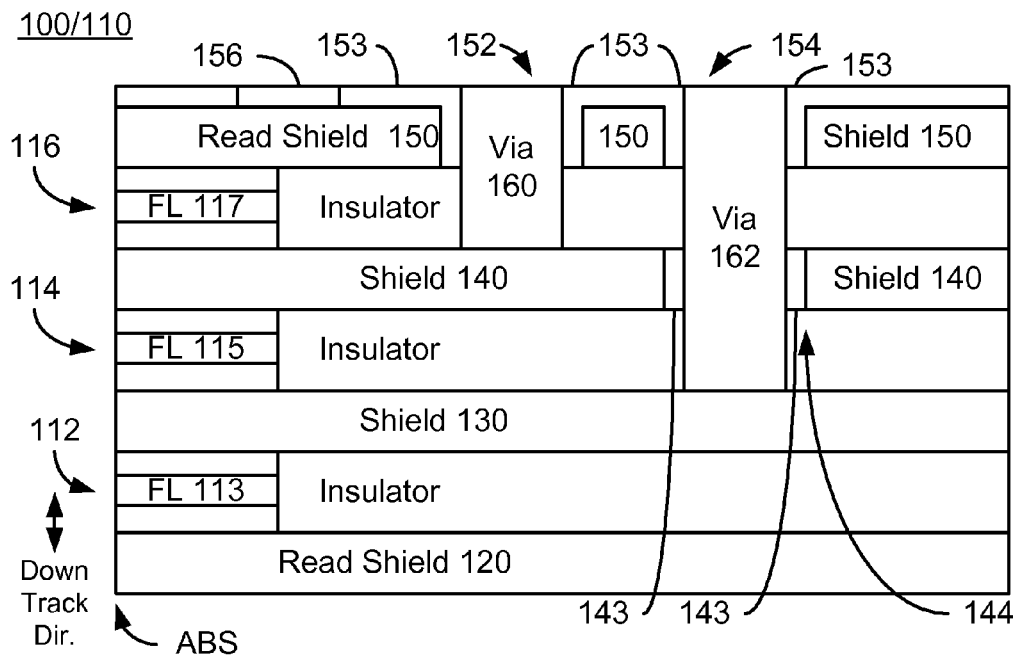
FIG. 4 depicts a side view of the exemplary embodiment of a portion of a magnetic recording read transducer.

FIGS. 2, 3 and 4 depict global, ABS and side views of a disk drive 100. For clarity, FIGS. 2 and 3 are not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used.

The disk drive 100 includes media 101, a slider 102, a head 103 including a write transducer 104 and a read transducer 110. The media 101 includes tracks 109. The write transducer includes at least a write pole 106 and coil(s) 108 for energizing the pole 106. Additional and/or different components may be included in the disk drive 100. Although not shown, the slider 102, and thus the transducers 104 and 110 are generally attached to a suspension (not shown). The transducers 104 and 110 are fabricated on the slider 102 and include an ABS proximate to the media 101 during use. Although both a write transducer 104 and a read transducer 110 are shown, in other embodiments, only a read transducer 110 may be present.

The read transducer 110 includes multiple read sensors 112, 114 and 116. The read sensors 112, 114 and 116 include sensor layers 113, 115 and 117, respectively, that may be free layers in a magnetoresistive junction such as a giant magnetoresistive (GMR) sensor, a tunneling magnetoresistive (TMR) sensor. Thus, each sensor 112, 114 and 116 may include a pinning layer, a pinned layer, a nonmagnetic spacer layer and a free layer 113, 115, and 117, respectively. For simplicity, only the free layers 113, 115 and 117 are separately labeled in FIGS. 3-4. The sensors 112, 114 and 116 may also include seed layer(s) (not shown) and capping layer(s) (not shown). The pinning layer is generally an AFM layer that is magnetically coupled to the pinned layer. In other embodiments, however, the pinning layer may be omitted or may use a different pinning mechanism. The free layers 113, 115 and 117 are each shown as a single layer, but may include multiple layers including but not limited to a synthetic antiferromagnetic (SAF) structure. The pinned layer may also be a simple layer or a multilayer. Although shown as extending the same distance from the ABS, the pinned layer may extend further than the corresponding free layer 113, 115, and/or 117, respectively. The nonmagnetic spacer layer may be a conductive layer, a tunneling barrier layer, or other analogous layer. Although depicted as a GMR or TMR sensor, in other embodiments, other structures and other sensing mechanisms may be used for the sensor.

The read sensors 112, 114 and 116 are separated by distances d1 and d2 in a down track direction. The down track direction is perpendicular to the cross track direction. The cross track direction and track width direction are the same. In the embodiment shown in FIGS. 2-4, the distance d1 and d2 between the sensors 112 and 114 and between the sensors 114 and 116, respectively, are the same. However, in other embodiments, the distances between the sensors 112, 114 and 116 may not be the same. It is generally desirable to reduce the distance between the sensors 112, 114 and 116 in order to reduce the skew effect. The distances d1 and d2 may each be at least ten nanometers and not more than four hundred nanometers. The read sensors 112, 114 and 116 have multiple widths, w1, w2 and w3, respectively, in the track width direction. In the embodiment shown, the central sensor 114 has the smallest width, w1. The sensors 112 and 116 are wider. In the embodiment shown, the sensors 112 and 116 have the same width. However, in other embodiments, other widths are possible. Further, the outer sensor(s) 112 and/or 116 may be narrower than the central sensor 114. The widths of the sensors 112, 114 and 116 may also be based on the track pitch. The track pitch is the distance from the center of one track to the center of the next track. The width, w2, is at least fifty and not more than one hundred twenty percent of the track pitch. In some such embodiments, the width of the sensor 114 is at least eighty percent and not more than one hundred percent of the track pitch. In some embodiments, the widths w1 and w3 are at least equal to the track pitch and not more than twice the track pitch. In some such embodiments, the widths w1 and w3 are each at least one hundred twenty percent and not more than one hundred fifty percent of the track pitch. However, the widths w1 and w3 may be less than or equal to the track pitch. Further, the widths may depend not only on the track pitch, but also on the distance between the sensors 112, 114 and 116.

The read sensors 112, 114 and 116 may also be displaced along the cross track direction. Therefore, the centers of each of the read sensors 112, 114 and 116 are not aligned along a vertical line that runs the down track direction. The read sensors 112, 114 and 116 may also overlap in the track width/cross track direction. In some embodiments, the read sensors 112, 114 and/or 116 overlap by at least five percent and not more than seventy percent of the widths w1, w2 and w3. In some such embodiments, the read sensors 112, 114 and/or 116 overlap by at least thirty percent and not more than forty percent of the widths w1, w2 and w3. Further, the amount of overlap may depend upon the distances d1 and d2 between the sensors 112, 114 and 116. In some embodiments, the overlap may be different. For example, the sensors 112, 114 and 116 may not overlap, but instead be spaced apart.

Also shown are bias structures 122, 123 and 124 that magnetically bias the read sensors 112, 114 and 116, respectively. The magnetic bias structure(s) 122, 123 and/or 124 may be soft bias structures fabricated with soft magnetic material(s). In other embodiments, the magnetic bias structure(s) 122, 123 and/or 124 may be hard magnetic bias structures. Other mechanisms for biasing the sensors 112, 114 and 116 might also be used.

The read sensors are separated by shields 130 and 140. The read sensors 112, 114 and 116 and shields 130 and 140 are surrounded by read shields 120 and 150. Thus, as used herein, a shield may be considered to be an internal shield, which is interleaved with read sensors and between the outer, read shields. The outermost shields for the read transducer 110 are termed read shields. In the embodiment shown in FIGS. 2-4, three read sensors 112, 114 and 116 and two internal shields 130 and 140 are shown. However, in another embodiment, another number of read sensors 112, 114 and 116 and internal shields 130 and 140 may be present. The shields/read shields 120, 130, 140 and 150 generally include soft magnetic material. In some embodiments, one or more of the shields 120, 130, 140 and 150 may include ferromagnetic layers that are antiferromagnetically coupled.

Current is driven perpendicular-to-plane for the sensors 112, 114 and 116. Thus, current is driven through the sensor 112 between the shields 120 and 130. Similarly, current is driven through the sensor 114 between the shields 130 and 140. Current is also driven through the sensor 116 between the shields 140 and 150. Thus, electrical connection is to be made to the shields 120, 130, 140 and 150. A contact 156 may be made directly to the read shield 150. However, to make connection to the internal shields 130 and 140, conductive vias 160 and 162 are used. More specifically, apertures 152 and 154 are formed in the read shield 150. Insulator 153 is provided to ensure that any conductive material within the apertures 152 and 154 is electrically isolated from the shield 150. The vias 160 and 162 thus provide electrical contact to the shields 140 and 130, respectively, but are isolated from the read shield 150. In some embodiments, the vias 160 and 162 may be formed of high conductivity materials such as Cu and/or Ag. Although not depicted in FIG. 4, an additional via and contact may be provided for the read shield 120. In other embodiments, with fewer shields and/or fewer read sensors, another number of conductive vias may be used. For example, if the sensor 112 and shield 130 were omitted, then the via 162 and aperture 154 may be omitted. In some embodiments, a preamplifier may be coupled between the read shield 150 and the shield 140. Another preamplifier may be coupled between the shields 130 and 140. A third preamplifier may be coupled between the shield 130 and the read shield 120. Thus, signals may be read from the sensors 112, 114 and 116.

The read transducer 110 may be used in higher density recording, such as TDMR. Through the placement of the sensors 112, 114 and 116, the transducer 110 may address skew issues that might otherwise adversely affect performance of the transducer 110. In applications such as TDMR, the sensors 112 and 116 may be better able to gather data for cancellation of noise from the tracks 109 adjacent to the track 109-A being read. Thus, the track edge noise, the cross track noise and adjacent track interference may be reduced. Using a noise cancellation process, the width of the read sensors 112, 114 and/or 116 may be kept relatively large even at ultra-high track densities. Thus, reading of very high density tracks may be accomplished. Further, the transducer 110 may be scalable.

In addition, the conductive vias 160 and 162 may provide electrical contact to the shields 140 and 130 with a relatively modest contact resistance. The contact resistance is the total resistance of the contact, which includes the path of the electrical leads as well as the contact area. For example, the contact resistance for the sensor 114 is the resistance from the top of the sensor 114 through the shield 140 and via 160 plus the resistance from the bottom of the sensor 114 through the shield 130 and via 162. Furthermore, the connection between an external contact (not shown in FIGS. 2-4) and the sensor 112 or 114 may have a contact resistance that is a significant percentage of the resistance of the TMR sensor 112 or 114. A relatively high contact resistance adversely affects performance of the transducer. The sensors 112 and 114 share a common lead through via 162. Similarly, the sensors 114 and 116 share a common lead through via 160. Thus, the contact resistance for the sensors 112, 114 and 116 may be reduced. Consequently, performance of the transducer 110 may be improved. For the reasons discussed above, the transducer 110 may exhibit improved performance and thus be capable of use at higher recording densities. This improved performance may be particularly beneficial for TDMR.

Figure 5:
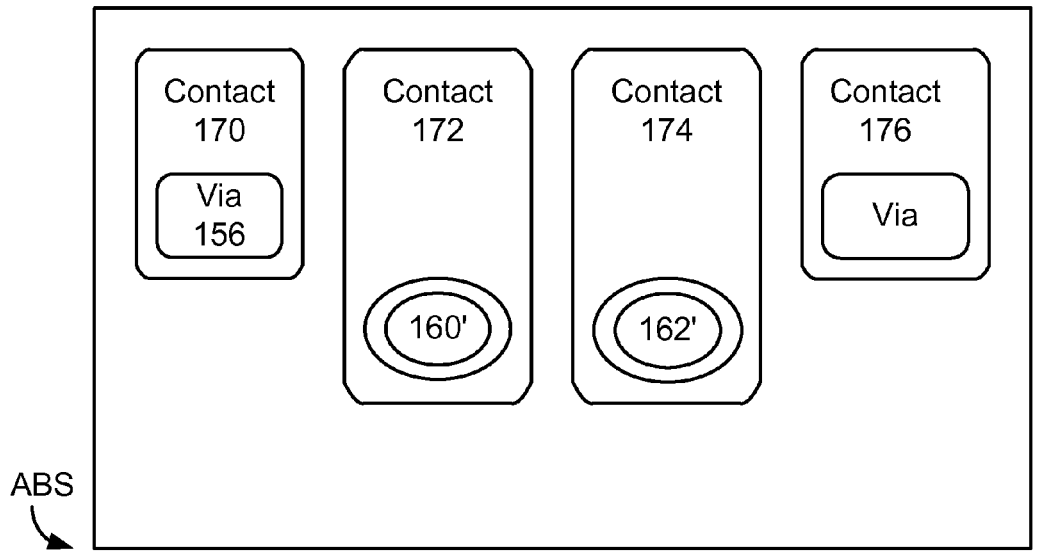
FIG. 5 depicts a plan view of another exemplary embodiment of a portion of a magnetic recording read transducer.

FIG. 5 depicts another exemplary embodiment of a portion of a magnetic recording read transducer 110' in disk drive 100'. For clarity, FIG. 5 is not to scale. The disk drive 100' and transducer 110' are analogous to the disk drive 100 and read transducer 110' depicted in FIGS. 2-4. Consequently, similar components have analogous labels. Conductive vias 156, 160' and 162' are analogous to the conductive vias 156, 160 and 162, respectively. For clarity, vias 156, 160' and 162' and contacts 170, 172, 174 and 176 are shown. Via 156 may be formed as shown. In some embodiments, conductive vias 160' and 162' are formed in an elliptical shape. In other embodiments, another corner-free shape may be used. In still other embodiments, the vias 160' and/or 162' may have substantially the same shape as the via 156, which includes corners. Further, one or more of the vias 160' and 162' may be closer to the ABS than remaining vias 156.

The magnetic read transducer 110'/disk drive 100' may share the benefits of the magnetic transducer 110/disk drive 100. For example, reduced contact resistance and improved performance may be achieved. In addition, the vias 160' and 162' are placed closer to the ABS than they may otherwise be. For example, the vias 160' and 162' are closer to the ABS than the via 156. The resistance of the connection through conductive vias 160' and 162' to the sensors 112 and 114 is proportional to the length of the connection. The internal portions of the vias 160' and 162' are closer to the ABS. Placement of the contacts 172 and 174 and vias 160' and 162' closer to the ABS reduces the length of the connection and, therefore, the resistance. As such, the contact resistance for the vias 160' and 162' may be reduced. Consequently, performance may be further improved. In addition, the vias 160' and 162' are shown as being substantially free of corners. This via shape allows for fewer stray fields from the corresponding apertures in the shields. Thus, magnetic instability may be reduced.

Figure 6:
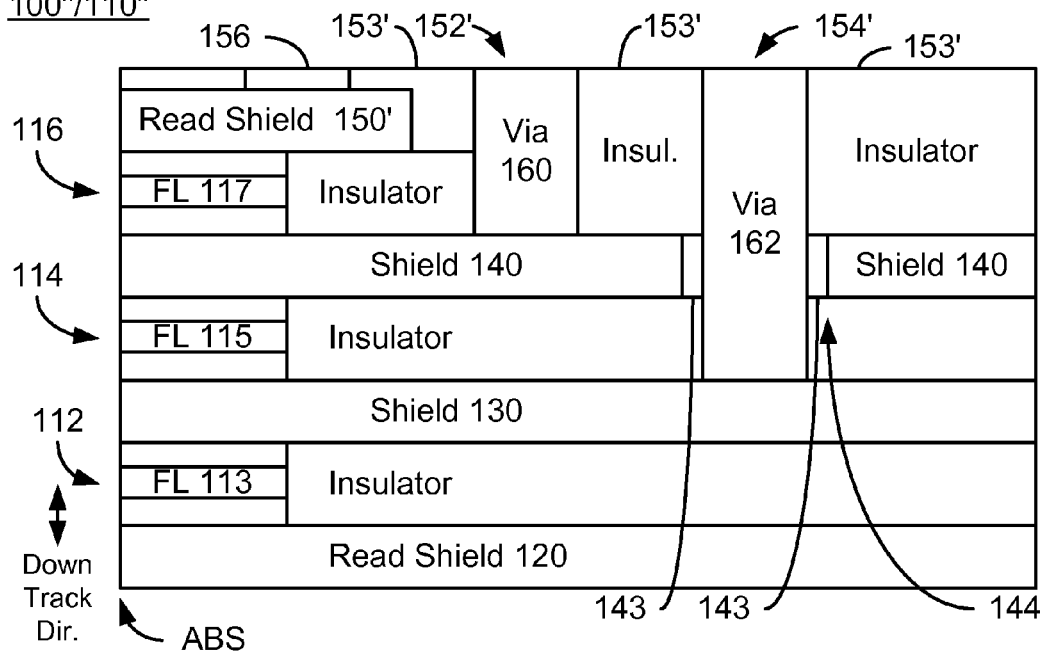
FIG. 6 depicts a side view of another exemplary embodiment of a portion of a magnetic recording read transducer.

FIG. 6 depicts another exemplary embodiment of a portion of a magnetic recording read transducer 110" in disk drive 100". For clarity, FIG. 6 is not to scale. The disk drive 100" and transducer 110" are analogous to the disk drive(s) 100/100' and read transducer 110'110' depicted in FIGS. 2-5. Consequently, similar components have analogous labels. The transducer 110' thus includes read shields 120 and 150', shields 130 and 140, sensors 112, 114 and 116 having free layers 113, 115 and 117, respectively, conductive vias 160 and 162 insulators 143 and 153', and apertures 144, 152' and 154' corresponding to read shields 120 and 150, shields 130 and 140, sensors 112, 114 and 116 having free layers 113, 115 and 117, respectively, conductive vias 160 and 162 insulators 143 and 153, and apertures 144, 152 and 154, respectively. Although not indicated in FIG. 6, the conductive vias 160 and 162 may be corner free and located closer to the ABS. However, the read shield 150' does not extend as far back as the shield(s) 120, 130 and/or 140. Apertures 152' and 154' are thus in insulating layer 153', rather than in the read shield 150. The magnetic read transducer 110"/disk drive 100" may share the benefits of the magnetic transducer 110/110'/disk drive 100/100'. For example, reduced contact resistance and improved performance may be achieved.

Figure 7:
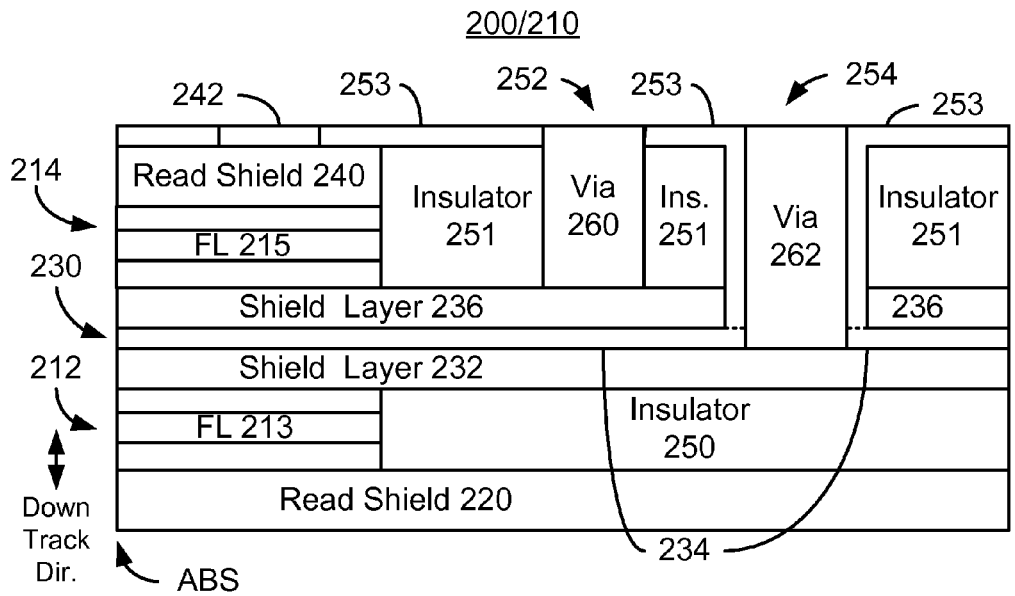
FIG. 7 depicts a side view of another exemplary embodiment of a portion of a magnetic recording read transducer.

FIG. 7 depicts a side view of a read transducer 210 in a disk drive 200. For clarity, FIG. 7 is not to scale. For simplicity not all portions of the transducer 210 are shown. In addition, although the read transducer 210 is depicted in the context of particular components other and/or different components may be used. For example, circuitry used to drive and control various portions of the transducer 210 is not shown. For simplicity, only single components are shown. However, multiples of one or more of the components and/or their subcomponents might be used.

The read transducer 210 and disk drive 200 are analogous to the read transducer 110/110'/110" and disk drive 100/100'/100", respectively. Thus, although not shown, the disk drive 200 may include a write transducer analogous to the write transducer 104, a slider analogous to the slider 102, and a suspension. Although only a read transducer 210 is shown, in other embodiments, both a write transducer (not shown) and a read transducer 210 may be present.

The read transducer 210 includes multiple read sensors 212 and 214 having free layers 213 and 215. The read sensors 212 and 214 are analogous to the read sensor 112 and 114, respectively. In the embodiment shown in FIG. 7, the read transducer 210 includes two read sensors 212 and 214. However, in another embodiment, the read transducer 210 may include another number of sensors. The read sensors 212 and 214 may have differing widths and be distributed in the cross track and down track directions in an analogous manner to that shown in the transducers 110, 110' and/or 110". Further, the transducer 210 may have magnetic bias structures (not shown in FIG. 7), is not shown.

The read sensors 212 and 214 are separated by shield 230. The shield 230 is analogous to the shields 130 and 140. The read sensors 212 and 214 and shield 230 are surrounded by read shields 220 and 240. The shields 220 and 240 are thus analogous to the shields 120 and 150, respectively. Thus, the shield 230 may be considered to be an internal shield, which is interleaved with read sensors and between the outer read shields 220 and 240. In the embodiment shown in FIG. 7, two read sensors 212 and 214 and one shield 130 are shown. However, in another embodiment, another number of read sensors 212 and 214 and internal shield(s) 230 may be present. In such embodiments, the shields separate and are interleaved with the sensors. The shields and read shields 220, 230 and 240 generally include soft magnetic material. In some embodiments, one or more of the shields 220, 230 and 240 may include ferromagnetic layers that are antiferromagnetically coupled.

The shield 230 between the sensors 212 and 214 is a multilayer having layers 232, 234 and 236. In particular, magnetic shield layers 232 and 236 are interleaved with and separated by insulating layer 234. The insulating layer 234 may be nonmagnetic, for example including or consisting of aluminum oxide. In other embodiments, the insulating layer 232 may be magnetic. Thus, the shield layer 232 is electrically insulated from the shield layer 236 but electrically connected to the sensor 212. Similarly, the shield layer 236 is electrically insulated from the shield layer 232 but electrically connected to the sensor 214.

Conductive vias 260 and 262 are analogous to the vias 160 and 162 in that conductive vias 260 and 262 are used to provide contact to particular components within the read transducer 210. Similarly, conductive via 242 provides contact to the read shield 240 and is analogous to the conductive via 156. The conductive vias 260 and 262 may include high conductivity material such as Cu and/or Ag. Further, the conductive vias 260 and/or 262 may be desired to be nonmagnetic. The conductive vias 260 and 262 provide connection to the shield layers 236 and 232, respectively. The via 260 is electrically insulated from the shield layer 232 and electrically connected to the shield layer 236. The via 262 is electrically insulated from the shield layer 236 and electrically connected to the shield layer 232. Thus, current can be driven between the read shield 220 and the shield layer 232 and through the sensor 212. Similarly current may be driven between the read shield 240 and the shield layer 236 and through the sensor 214. In some embodiments, a preamplifier may be coupled between the read shield 220 and the shield layer 232. Another preamplifier may be coupled between the read shield 240 and the shield layer 236. Thus, current may be driven perpendicular-to-plane for the sensors 212 and 214. In addition, signals may be read from the sensors 212 and 214. Although not depicted in FIG. 7, an additional via and contact may be provided for the read shield 220. In other embodiments, with fewer shields and/or fewer read sensors, another number of conductive vias may be used.

The read transducer 210 may be used in higher density recording, such as TDMR. Through the placement of the sensors 212 and 214, the transducer 210 may address skew issues that might otherwise adversely affect performance of the transducer 210. Thus, the track edge noise, the cross track noise and adjacent track interference may be reduced. Using a noise cancellation process, the width of the read sensors 212 and/or 214 may be kept relatively large even at ultra-high track densities. Thus, reading of very high density tracks may be accomplished. Further, the transducer 210 may be scalable. In addition, the conductive vias 260 and 262 may provide electrical contact to the shield layers 232 and 236 of the shield 230, potentially with a relatively modest contact resistance. Consequently, performance of the transducer 210 may be improved. For the reasons discussed above, the transducer 210 may exhibit improved performance and thus be capable of use at higher recording densities. This improved performance may be particularly beneficial for TDMR.

Figure 8:
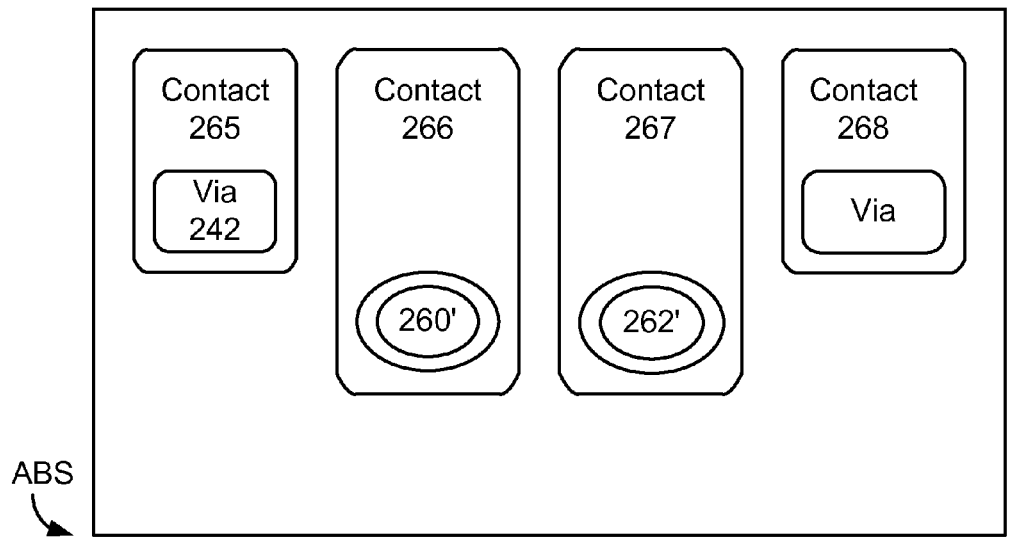
FIG. 8 depicts a plan view of another exemplary embodiment of a portion of a magnetic recording read transducer.

FIG. 8 depicts another exemplary embodiment of a portion of a magnetic recording read transducer 210' in disk drive 200'. For clarity, FIG. 8 is not to scale. The disk drive 200' and transducer 210' are analogous to the disk drive 200 and read transducer 210 depicted in FIG. 7. Consequently, similar components have analogous labels. Conductive vias 242, 260' and 262' are analogous to the conductive vias 242, 260 and 262, respectively. For clarity, vias 242, 260' and 262' and contacts 265, 266, 267 and 268 are shown. Via 242 may be formed as shown. In some embodiments, conductive vias 260' and 262' are formed in an elliptical shape. In other embodiments, another corner-free shape may be used. In still other embodiments, the vias 260' and/or 262' may have substantially the same shape as the via 242, which includes corners. Further, one or more of the vias 260' and 262' may be closer to the ABS than remaining vias 242.

The magnetic read transducer 210'/disk drive 200' may share the benefits of the magnetic transducer 210/disk drive 200. For example, improved high magnetic recording density performance may be achieved. In addition, the vias 260' and 262' are placed closer to the ABS than they may otherwise be. For example, the vias 260' and 262' are closer to the ABS than the via 242. The resistance of the electrical connection through the conductive vias 260' and 262' is proportional to the length of the connection. The internal portions of the vias 260' and 262' are closer to the ABS. Placement of the contacts 266 and 267 and vias 260' and 262' closer to the ABS reduces the length of the contact and, therefore, the contact resistance. Consequently, performance of the transducer 210' may be further improved. In addition, the vias 260' and 262' are shown as being substantially free of corners. This via shape allows for fewer stray fields from the corresponding apertures in the shields. Thus, magnetic instability may be reduced.

Figure 9:
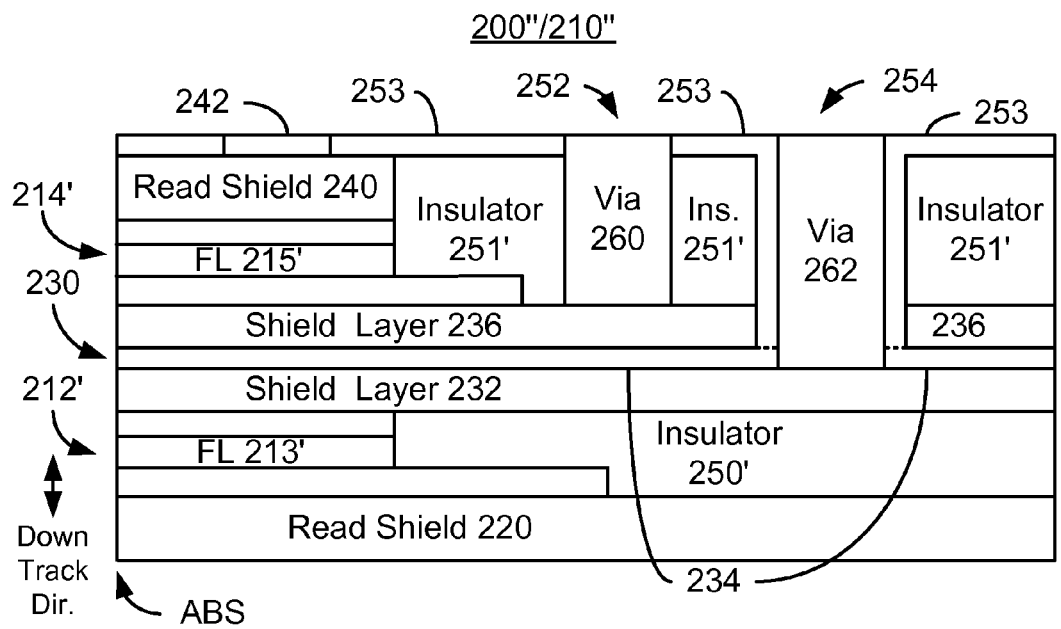
FIG. 9 depicts a side view of another exemplary embodiment of a portion of a magnetic recording read transducer.

FIG. 9 depicts another exemplary embodiment of a portion of a magnetic recording read transducer 210" in disk drive 200". For clarity, FIG. 9 is not to scale. The disk drive 200" and transducer 210" are analogous to the disk drive(s) 200/200' and read transducer 210/210' depicted in FIGS. 7-8. Consequently, similar components have analogous labels. The transducer 210" thus includes read shields 220 and 240, shield 230 having shield layers 232 and 236 separated by an insulating layer 234, sensors 212' and 214' having free layers 213' and 215', respectively, conductive vias 260 and 262, insulators 250', 251' and 253, conductive via 242, and apertures 252 and 254 corresponding to read shields 220 and 240, shield 230 having shield layers 232 and 236 separated by an insulating layer 234, sensors 212 and 214 having free layers 213 and 215, respectively, conductive vias 260 and 262, insulators 250, 251 and 253, conductive via 242, and apertures 252 and 254, respectively. Although not indicated in FIG. 9, the conductive vias 260 and 262 may be corner free and located closer to the ABS.

However, a portion of the sensor 214' extends further from the ABS than the free layer 215'. Similarly, a portion of the sensor 212' extends further from the ABS than the free layer 213'. In some embodiments, these portions are the pinned layers for the sensors 212' and 214'.

The magnetic read transducer 210"/disk drive 200" may share the benefits of the magnetic transducer 210/210'/disk drive 200/200'. For example, reduced contact resistance and improved performance may be achieved. In addition, use of the extended pinned layer may further improve performance of the read sensors 212' and 214'.

Figure 10:
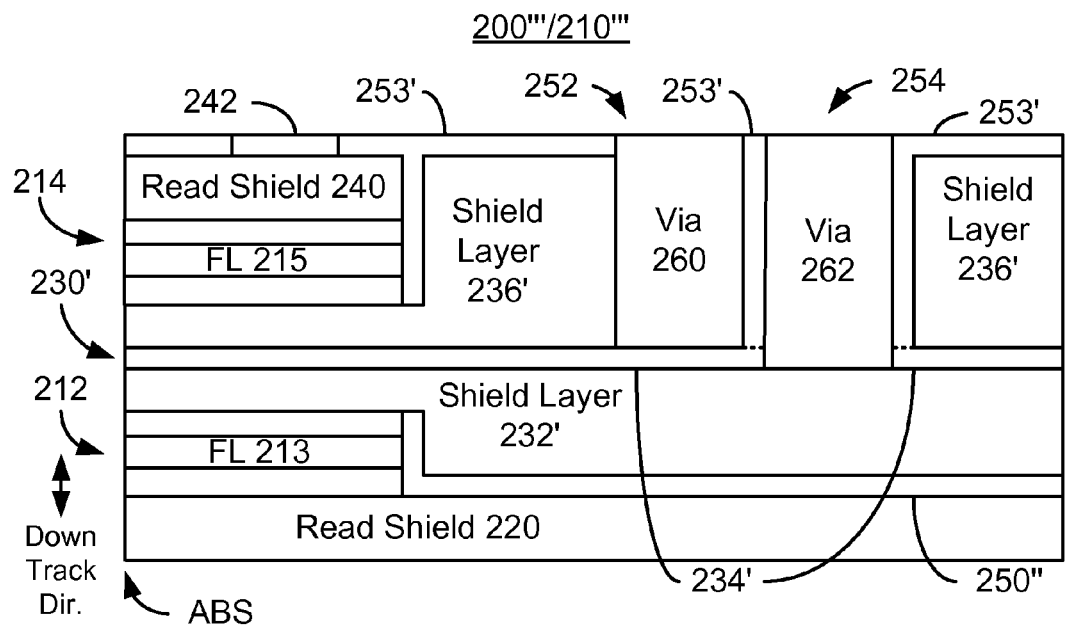
FIG. 10 depicts a side view of another exemplary embodiment of a portion of a magnetic recording read transducer.

FIG. 10 depicts another exemplary embodiment of a portion of a magnetic recording read transducer 210''' in disk drive 200'''. For clarity, FIG. 10 is not to scale. The disk drive 200''' and transducer 210''' are analogous to the disk drive(s) 200/200'/200'' and read transducer 210/210'/210" depicted in FIGS. 7-9. Consequently, similar components have analogous labels. The transducer 210''' thus includes read shields 220 and 240, shield 230' having shield layers 232' and 236' separated by an insulating layer 234', sensors 212 and 214 having free layers 213 and 215, respectively, conductive vias 260 and 262, insulators 250" and 253', conductive via 242, and apertures 252 and 254 corresponding to read shields 220 and 240, shield 230 having shield layers 232 and 236 separated by an insulating layer 234, sensors 212/212' and 214/214' having free layers 213/213' and 215/215', respectively, conductive vias 260 and 262, insulators 250 and 253, conductive via 242, and apertures 252 and 254, respectively. Although not indicated in FIG. 10, the conductive vias 260 and 262 may be corner free and located closer to the ABS.

The shield layers 232' and 236' have been extended to provide larger regions that connect to the conductive vias 262 and 260, respectively. In some embodiments, a portion of the shield layers 232' and 236' may be considered to be formed of a magnetic conductive filler that resides in the region behind the sensors 212 and 214 that might otherwise be filled with an insulator. The shield layers 232' and 236' are higher conductivity ferromagnetic materials, such as ferromagnetic metallic NiFe. Thus, the back gap region behind the sensors 212 and 214 may be filled with ferromagnetic metals. Because of the presence of the additional higher conductivity materials, the contact resistance for the shield layers 232' and 236' may be reduced. Thus, the contact resistance may a smaller percentage of the resistance of the sensors 212 and 214. Thus, the contacts may be less likely to interfere with the functioning of the sensors.

The magnetic read transducer 210''' and disk drive 200''' may share the benefits of the magnetic transducer 210/210'/210'' and disk drive 200/200'/200'', respectively. For example, reduced contact resistance and improved performance may be achieved.

Figure 11:
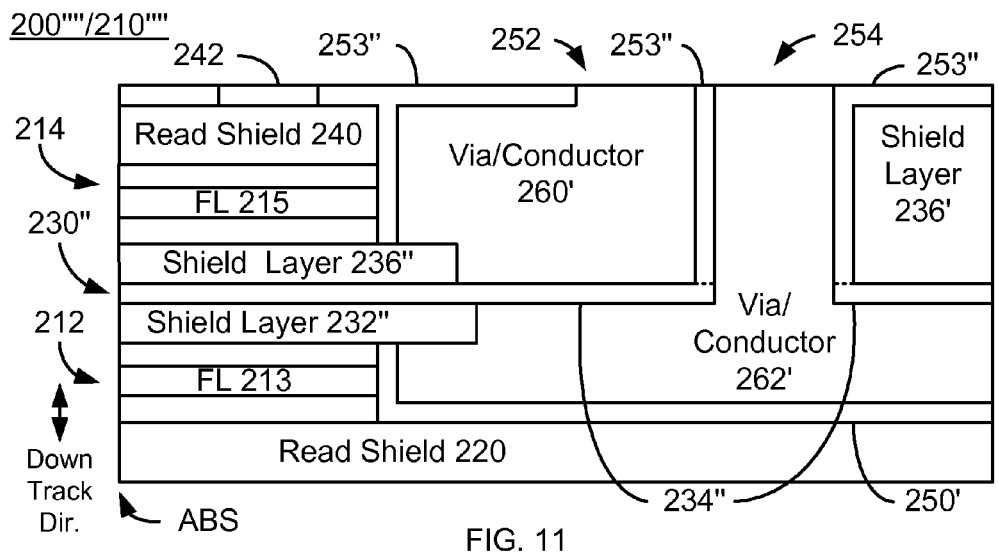
FIG. 11 depicts a side view of another exemplary embodiment of a portion of a magnetic recording read transducer.

FIG. 11 depicts another exemplary embodiment of a portion of a magnetic recording read transducer 210'''' in disk drive 200''''. For clarity, FIG. 11 is not to scale. The disk drive 200'''' and transducer 210'''' are analogous to the disk drive(s) 200/200'/200''/200'' and read transducer 210/210'/210''/210''' depicted in FIGS. 7-10. Consequently, similar components have analogous labels. The transducer 210'''' thus includes read shields 220 and 240, shield 230'' having shield layers 232'' and 236'' separated by an insulating layer 234'', sensors 212 and 214 having free layers 213 and 215, respectively, conductive vias 260' and 262', insulators 253'', conductive via 242, and apertures 252 and 254 corresponding to read shields 220 and 240, shield 230/230' having shield layers 232/232' and 236/236' separated by an insulating layer 234, sensors 212/212' and 214/214' having free layers 213/213' and 215/215', respectively, conductive vias 260 and 262, insulator 253/253', conductive via 242, and apertures 252 and 254, respectively. Although not indicated in FIG. 11, the conductive vias 260' and 262' may be corner free and located closer to the ABS.

In the embodiment shown, the conductive vias 260' and 262' have been extended to provide a larger area for electrical connection to the shield layers 232'' and 236''. In some embodiments, conductive filler may be considered to make up part of the conductive vias 260' and 262' that is not directly below the apertures 252 and 254, respectively. Stated differently, a conductive filler may replace the insulator that would otherwise reside behind the sensors 212 and 214. The conductive vias 260' and 262' are high conductivity materials, such as metallic Cu and/or Ag. Thus, the back gap region behind the sensors 212 and 214 may be filled with high conductivity material. Because of the presence of the additional high conductivity materials, the contact resistance for the shield layers 232'' and 236'' may be reduced. Thus, the contact resistance may a smaller percentage of the resistance of the sensors 212 and 214. Thus, the contacts may be less likely to interfere with the functioning of the sensors.

Further, the shield layers 232'' and 236'' have been extended. The magnetic shield layers 232'' and 236'' thus need not extend the same distance from the ABS as any portion of the sensors 212 and 214. Similarly, the shield layers 232'' and 236'' need not extend the same distance from the ABS as the read shield 220 or 240. Although depicted as extending different distances from the ABS, the back edges of the shield layers 232'' and 236'' may be the same distance from the ABS.

The magnetic read transducer 210'''' and disk drive 200'''' may share the benefits of the magnetic transducer 210/210'/210''/210''' and disk drive 200/200'/200''/200''', respectively. For example, reduced contact resistance and improved performance may be achieved.

Figure 12:
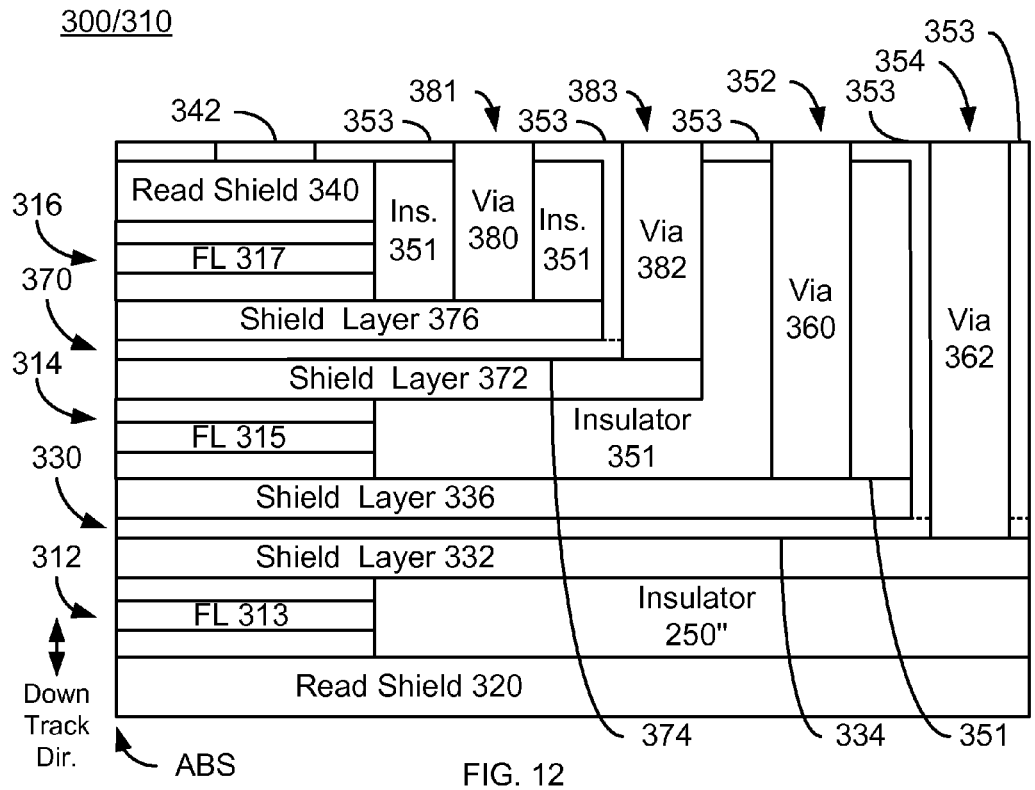
FIG. 12 depicts a side view of another exemplary embodiment of a portion of a magnetic recording read transducer.

FIG. 12 depicts a side view of a read transducer 310 in a disk drive 300. For clarity, FIG. 12 is not to scale. For simplicity not all portions of the transducer 310 are shown. In addition, although the read transducer 310 is depicted in the context of particular components other and/or different components may be used. For example, circuitry used to drive and control various portions of the transducer 310 is not shown. For simplicity, only single components are shown. However, multiples of one or more of the components and/or their sub-components might be used.

The read transducer 310 and disk drive 300 are analogous to the read transducers 110, 110', 110'', 210, 210', 210'', 210''', and 210'''' and to disk drive 100, 100', 100'', 200, 200', 200'', 200''' and 200'''', respectively. Thus, although not shown, the disk drive 300 may include a write transducer analogous to the write transducer 104, a slider analogous to the slider 102, and a suspension. Although only a read transducer 310 is shown, in other embodiments, both a write transducer (not shown) and a read transducer 310 may be present.

The read transducer 310 includes multiple read sensors 312 and 314 having free layers 313 and 315, read shields 320 and 340, shield 330 having shield layers 332 and 336 separated by insulating layer 334, insulators 351 and 353, apertures 352 and 354 and conductive vias that correspond to those components depicted in one or more of FIGS. 2-12. In addition, the read transducer 310 includes an additional read sensor 316 having free layer 317 and shield 370 having shield layers 372 and 376 separated by insulating layer 374. The read sensor 316 is analogous to the read sensors 312 and/or 314. The shield 370 is analogous to the shield 330. The shield layers 372 and 376 thus include a high permeability material, such as NiFe. The magnetic shield layers 372 and 376 are thus interleaved with and separated by insulating layer 374. The insulating layer 374 may be nonmagnetic, for example including or consisting of aluminum oxide. In other embodiments, the insulating layer 374 may be magnetic. Thus, the shield layer 372 is electrically insulated from the shield layer 376 but electrically connected to the sensor 314. Similarly, the shield layer 376 is electrically insulated from the shield layer 372 but electrically connected to the sensor 316.

Conductive vias 380 and 382 are analogous to the vias 360 and 362. The conductive vias 380 and 382 may include high conductivity material such as Cu and/or Ag. Further, the conductive vias 380 and/or 382 may be desired to be nonmagnetic. The conductive vias 380 and 382 are insulated from each other. The conductive via 380 provides electrical connection to the shield layer 376, while the conductive via 382 provides electrical connection to the shield layer 372. Thus, current can be driven between the shield layers 372 and 336 as well as through the sensor 314. Similarly current may be driven between the read shield 340 and the shield layer 376 and through the sensor 316. In some embodiments, a preamplifier may be coupled between the read shield 340 and the shield layer 376. Another preamplifier may be coupled between the shield layers 372 and 336. Thus, current may be driven perpendicular-to-plane for the sensors 314 and 316. Signals may be read from the sensors 314 and 316. Although not depicted in FIG. 12, an additional via and contact may be provided for the shield 320. In other embodiments, with fewer shields and/or fewer read sensors, another number of conductive vias may be used.

The read transducer 310 may be used in higher density recording, such as TDMR. Through the placement of the sensors 312, 314 and 316, the transducer 310 may address skew issues that might otherwise adversely affect performance. Thus, the track edge noise, the cross track noise and adjacent track interference may be reduced. Using a noise cancellation process, the width of the read sensors 312, 314 and/or 316 may be kept relatively large even at ultra-high track densities. Thus, reading of very high density tracks may be accomplished. Further, the transducer 310 may be scalable. In addition, the conductive vias 360, 362, 380 and 382 may provide electrical contact to the shield layers 332, 336, 372 and 376 of the shields 330 and 370. This electrical contact may be made with a relatively modest contact resistance. Consequently, performance of the transducer 310 may be improved. For the reasons discussed above, the transducer 310 may exhibit improved performance and thus be capable of use at higher recording densities. This improved performance may be particularly beneficial for TDMR. Various embodiments have been depicted in FIGS. 2-12. These embodiments highlight various features of the transducers and disk drives depicted therein. However, one or more of the features of the transducers depicted in FIGS. 2-12 may be combined in other embodiments.

Figure 13:
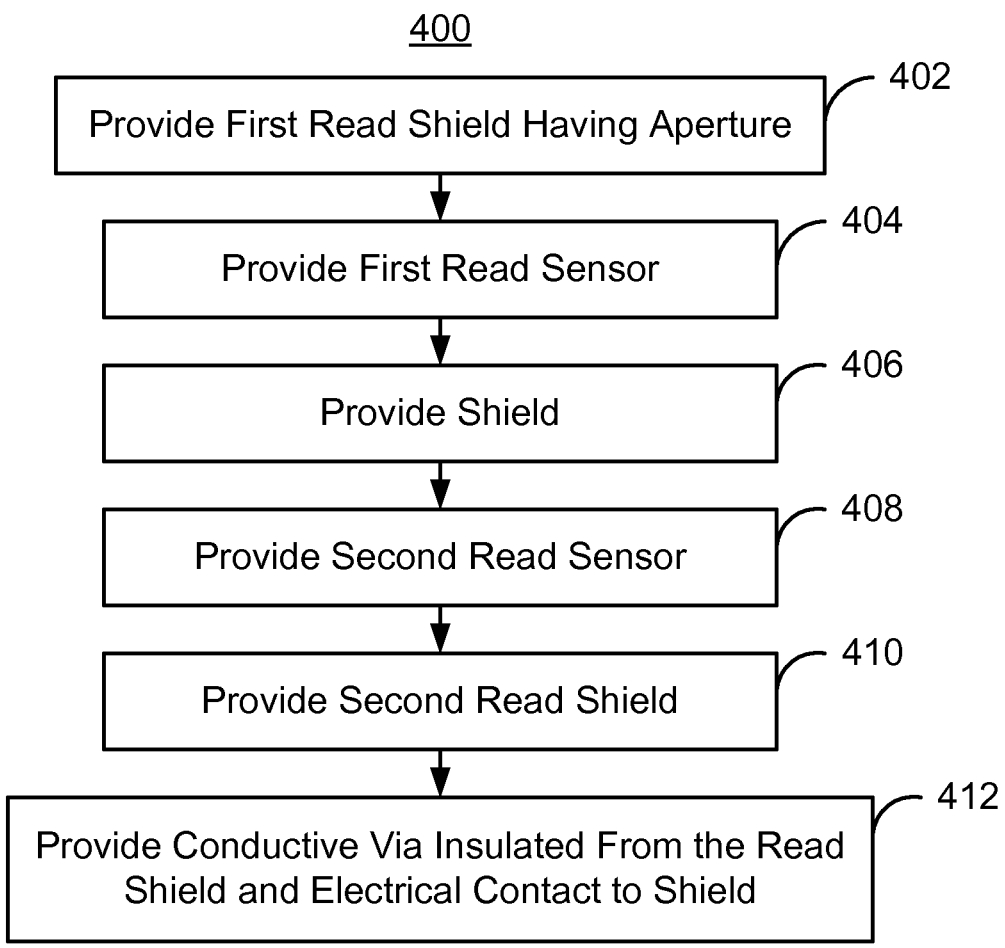
FIG. 13 is a flow chart depicting an exemplary embodiment of a method for fabricating a magnetic recording read transducer.

FIG. 13 is an exemplary embodiment of a method 400 for providing a read transducer including multiple read sensors having different widths. For simplicity, some steps may be omitted, interleaved, and/or combined. The method 400 is also described in the context of providing a single recording transducer 110 depicted in FIGS. 2-4. However, the method 400 may be used to fabricate multiple transducers at substantially the same time. The method 400 may also be used to fabricate other transducers including but not limited to any combination of those disclosed in FIGS. 2-12. The method 400 is also described in the context of particular layers. A particular layer may include multiple materials and/or multiple sub-layers. The method 400 also may start after formation of other portions of the magnetic recording transducer.

The first read shield 120 is provided, via step 402. Step 402 typically includes depositing a large high permeability layer. The read sensor 112 is provided, via step 404. Step 404 includes depositing the layers for the sensor 112 and defining the sensor 112 in at least the track width direction using an ion mill. In some embodiments, the free layer 113 and the pinned layer of the sensor 112 is also defined in the stripe height direction. The magnetic bias structures for the sensor 112 may also be provided as part of step 404.

The shield 130 is provided, via step 406. In some embodiments, step 406 includes depositing a soft magnetic material, such as NiFe. The read sensor 114 is provided, via step 408. Step 408 includes depositing the layers for the sensor 114 and defining the sensor 114 in at least the track width direction using an ion mill. In some embodiments, the free layer 115 and the pinned layer of the sensor 114 is also defined in the stripe height direction. The magnetic bias structures for the sensor 114 may also be provided.

If sensor 116 is to be used, then the shield 140 and sensor 116 may be provided in a manner analogous to steps 404 and 406. If, however, two sensors 112 and 114 are to be used, then the read shield 150 is provided, via step 410. Step 410 may include forming a shield having ferromagnetic layers which are antiferromagnetically coupled. In other embodiments, other multilayers or a single layer may be formed.

Conductive via 162 is provided, via step 412. The conductive via 162 may be provided through an aperture 154 in the read shield 150. The conductive via 162 is electrically isolated from the read shield 150, but electrically connected to the shield 130. In embodiments in which the sensor 116 and shield 140 are used, step 412 may also include forming conductive via 160. Thus, the benefits of the magnetic transducer(s) 110, 110', 110" and/or 110'" may be achieved.

Figure 14:
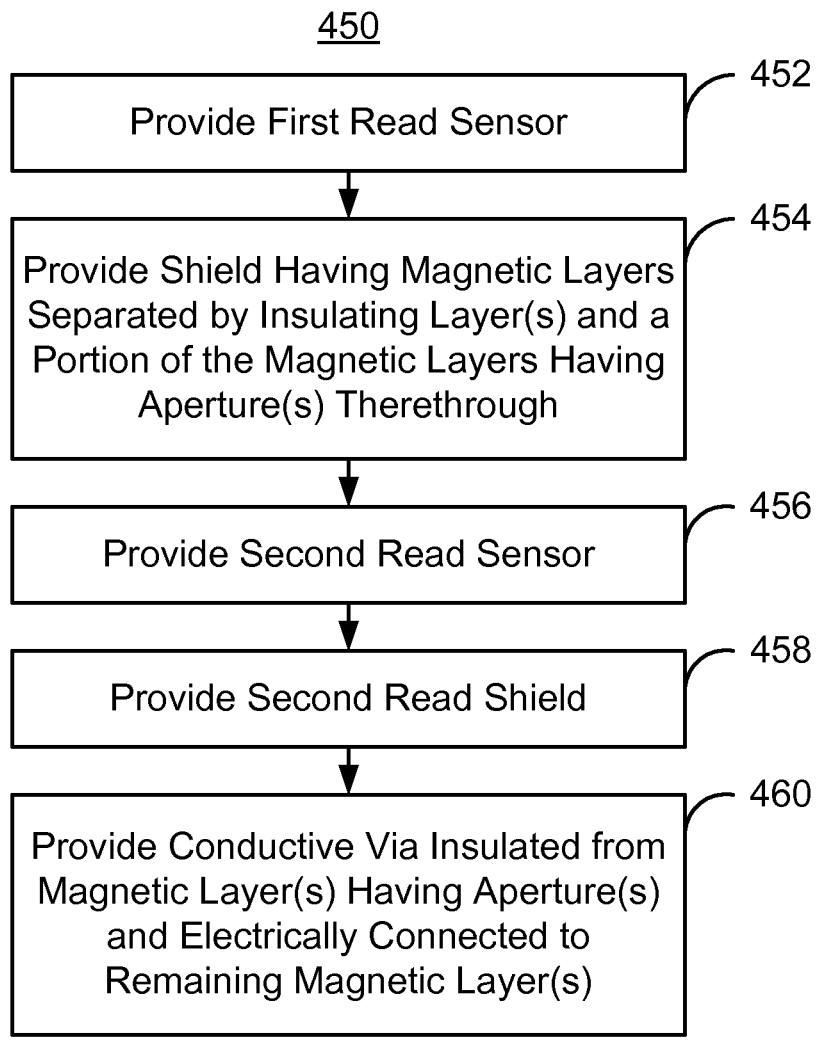
FIG. 14 is a flow chart depicting another exemplary embodiment of a method for fabricating a magnetic recording read transducer.

FIG. 14 is an exemplary embodiment of a method 450 for providing a read transducer including multiple read sensors having different widths. For simplicity, some steps may be omitted, interleaved, and/or combined. The method 450 is also described in the context of providing a single recording transducer 210 depicted in FIG. 7. However, the method 450 may be used to fabricate multiple transducers at substantially the same time. The method 450 may also be used to fabricate other transducers including but not limited to any combination of those disclosed in FIGS. 2-12. The method 450 is also described in the context of particular layers. A particular layer may include multiple materials and/or multiple sub-layers. The method 450 also may start after formation of other portions of the magnetic recording transducer. For example, the method 450 may commence after the first read shield 120 is provided.

The read sensor 212 is provided, via step 452. Step 452 includes depositing the layers for the sensor 212 and defining the sensor 212 in at least the track width direction using an ion mill. In some embodiments, the free layer 213 and the pinned layer of the sensor 212 is also defined in the stripe height direction. The magnetic bias structures for the sensor 212 may also be provided as part of step 452.

The shield 230 is provided, via step 454. Step 454 thus includes depositing the layers 232, 234 and 236 of the shield 230. Step 454 also may include forming the aperture 254 in the shield layer 236 and the insulating layer 234 such that connection may be made to the shield layer 232.

The read sensor 214 is provided, via step 456. Step 456 includes depositing the layers for the sensor 214 and defining the sensor 214 in at least the track width direction using an ion mill. In some embodiments, the free layer 215 and the pinned layer of the sensor 214 are also defined in the stripe height direction. The magnetic bias structures for the sensor 214 may also be provided.

If sensor 316 is to be used, then the shield 370 and sensor 316 may be provided in a manner analogous to steps 452 and 454. If, however, two sensors 212 and 214 are to be used, then the read shield 240 may be provided, via step 458. Step 458 may include forming a shield having ferromagnetic layers which are antiferromagnetically coupled. In other embodiments, other multilayers or a single layer may be formed.

Conductive vias 260 and 262 are provided, via step 460. The conductive via 262 may be provided through an aperture 254 in the shield layer 236. The conductive via 262 is electrically isolated from both the read shield 240 and the shield layer 236, but electrically connected to the shield layer 232. Similarly, conductive via 260 may be provided through an aperture 252 in the read shield 240 or other layer. The conductive via 260 is isolated from the read shield 240 and shield layer 232, but electrically connected to the shield layer 236. In embodiments in which the sensor 316 and shield 370 are used, step 460 may also include forming conductive vias 380 and 382. Thus, the benefits of the magnetic transducer(s) depicted in FIGS. 7-12 may be achieved.

We claim:

1. A magnetic read transducer having an air-bearing surface (ABS) and comprising:
    a first read shield having a read shield aperture therein;
    a first read sensor;
    a shield;
    a conductive via extending through the read shield aperture, providing electrical contact to the shield and being insulated from the first read shield;
    a second read sensor, the shield residing between the first read sensor and the second read sensor; and
    a second read shield, the first read sensor, the second read sensor and the shield residing between the first read shield and the second read shield.

2. A magnetic read transducer having an air-bearing surface (ABS) and comprising:
    a first read sensor;
    a shield having a first shield layer, a second shield layer and an insulating layer between the first shield layer and the second shield layer, the first shield layer residing between the first read sensor and the second shield layer, the second shield layer having an aperture therein;
a conductive via extending through the aperture in the second shield layer, providing electrical contact to the first shield layer and being insulated from the second shield layer;
a second read sensor, the first shield layer residing between the first read sensor and the second read sensor, the second shield layer being between the first shield layer and the second read sensor.

3. The magnetic read transducer of claim 2 further comprising:
an additional conductive via for providing electrical contact to the second shield layer.

4. The magnetic transducer of claim 2 further comprising:
a first read shield; and
a second read shield, the first read sensor, the second read sensor and the shield residing between the first read shield and the second read shield.

5. The magnetic transducer of claim 4 further comprising:
a plurality of shield contacts, a first shield contact for the first read shield recessed from the ABS by a first distance, a second shield contact for the second read shield recessed from the ABS by a second distance and at least a third shield contact for the shield recessed from the ABS by a third distance, the third distance being less than the first distance and less than the second distance.

6. The magnetic transducer of claim 2 further comprising:
a third read sensor;
an additional shield having a first additional shield layer, a second additional shield layer and an additional insulating layer between the first additional shield layer and the second additional shield layer, the first additional shield layer residing between the second read sensor and the second additional shield layer, the second additional shield layer having an additional aperture therein, the additional shield residing between the second read sensor and the third read sensor, the second additional shield layer being between the first additional shield layer and the third read sensor; and
an additional conductive via extending through the additional aperture in the second additional shield layer, providing electrical contact to the first additional shield layer and being insulated from the second additional shield layer.

7. The magnetic transducer of claim 6 wherein the additional shield has a second additional aperture therein, the conductive via extending through the additional shield and being insulated from the first additional shield layer and the second additional shield layer.

8. The magnetic transducer of claim 2 further comprising:
at least one contact for the shield, the at least one contact having an oval footprint.

9. The magnetic transducer of claim 2 further including:
conductive filler isolated from the first read sensor, electrically connected with the conductive via and electrically connected with the first shield layer, the first read sensor and first shield layer residing between the conductive filler and the ABS.

10. The magnetic transducer of claim 9 wherein at least a portion of the conductive filler is magnetic.

11. The magnetic transducer of claim 2 further including:
conductive filler isolated from the second read sensor, electrically connected with the second shield layer, and electrically isolated from the conductive via, the second read sensor and second shield layer residing between the conductive filler and the ABS.

12. The magnetic transducer of claim 11 wherein at least a portion of the conductive filler is magnetic.

13. The magnetic transducer of claim 2 further including:
first conductive filler isolated from the first read sensor, electrically connected with the conductive via and electrically connected with the first shield layer, the first read sensor and first shield layer residing between the first conductive filler and the ABS; and
second conductive filler isolated from the second read sensor, electrically connected with the second shield layer, and electrically isolated from the conductive via, the second read sensor and second shield layer residing between the second conductive filler and the ABS.

14. The magnetic transducer of claim 13 wherein at least a portion of at least one of the first conductive filler and the second conductive filler is magnetic.

15. The magnetic transducer of claim 2 wherein the first read sensor and the second read sensor are displaced in the cross track direction.

16. The magnetic transducer of claim 15 wherein the first read sensor has a first width, the second read sensor has a second width different from the first width.

17. A disk drive comprising:
a media;
a slider including a magnetic read transducer having an air-bearing surface (ABS), the read transducer including a first read shield having a read shield aperture therein, a first read sensor, a shield, and a conductive via, the conductive via extending through the read shield aperture, providing electrical contact to the shield and being insulated from the first read shield, the read transducer further including a second read sensor, the shield residing between the first read sensor and the second read sensor and a second read shield, the first read sensor, the second read sensor and the shield residing between the first read shield and the second read shield.

18. A disk drive comprising:
a media;
a slider including a magnetic read transducer having an air-bearing surface (ABS), the magnetic read sensor including a first read sensor, a shield, a conductive via and a second read sensor, the shield having a first shield layer, a second shield layer and an insulating layer between the first shield layer and the second shield layer, the first shield layer residing between the first read sensor and the second shield layer, the second shield layer having an aperture therein, the conductive via extending through the aperture in the second shield layer, providing electrical contact to the first shield layer and being insulated from the second shield layer, the first shield layer residing between the first read sensor and the second read sensor, the second shield layer being between the first shield layer and the second read sensor.

19. The disk drive of claim 18 wherein the magnetic transducer further includes:
a first read shield; and
a second read shield, the first read sensor, the second read sensor and the shield residing between the first read shield and the second read shield.

20. The disk drive of claim 19 wherein the magnetic transducer further includes:
a plurality of shield contacts, a first shield contact for the first read shield recessed from the ABS by a first distance, a second shield contact for the second read shield recessed from the ABS by a second distance and at least a third shield contact for the shield recessed from the ABS by a third distance, the third distance being less than the first distance and less than the second distance.

21. The disk drive of claim 18 wherein the magnetic transducer further includes at least one of a first conductive filler and a second conductive filler, the first conductive filler being isolated from the first read sensor, electrically connected with the conductive via and electrically connected with the first shield layer, the first read sensor and first shield layer residing between the first conductive filler and the ABS, the second conductive filler being isolated from the second read sensor, electrically connected with the second shield layer, and electrically isolated from the conductive via, the second read sensor and second shield layer residing between the second conductive filler and the ABS.

22. The disk drive of claim 21 wherein at least a portion of the at least one of the first conductive filler and the second conductive filler is magnetic.

23. A method for providing a magnetic read transducer having an air-bearing surface (ABS), the method comprising:
   providing a first read shield having a read shield aperture therein;
   providing a first read sensor;
   providing a shield;
   providing a conductive via, the conductive via extending through the read shield aperture, providing electrical contact to the shield and being insulated from the first read shield;
   providing a second read sensor, the shield residing between the first read sensor and the second read sensor; and
   providing a second read shield, the first read sensor, the second read sensor and the shield residing between the first read shield and the second read shield.

24. A method for providing a magnetic read transducer having an air-bearing surface (ABS) and comprising:
   providing a first read sensor;
   providing a shield having a first shield layer, a second shield layer and an insulating layer between the first shield layer and the second shield layer, the first shield layer residing between the first read sensor and the second shield layer, the second shield layer having an aperture therein;
   providing a conductive via extending through the aperture in the second shield layer, providing electrical contact to the first shield layer and being insulated from the second shield layer;
   providing a second read sensor, the first shield layer residing between the first read sensor and the second read sensor, the second shield layer being between the first shield layer and the second read sensor.

25. The method of claim 24 wherein the method further includes:
   providing a first read shield; and
   providing a second read shield, the first read sensor, the second read sensor and the shield residing between the first read shield and the second read shield.

26. The method of claim 25 further comprising:
   providing a plurality of shield contacts, a first shield contact for the first read shield recessed from the ABS by a first distance, a second shield contact for the second read shield recessed from the ABS by a second distance and at least a third shield contact for the shield recessed from the ABS by a third distance, the third distance being less than the first distance and less than the second distance.

27. The method of claim 25 further comprising:
   providing at least one of a first conductive filler and a second conductive filler, the first conductive filler being isolated from the first read sensor, electrically connected with the conductive via and electrically connected with the first shield layer, the first read sensor and first shield layer residing between the first conductive filler and the ABS, the second conductive filler being isolated from the second read sensor, electrically connected with the second shield layer, and electrically isolated from the conductive via, the second read sensor and second shield layer residing between the second conductive filler and the ABS.

28. The method of claim 27 wherein at least a portion of the at least one of the first conductive filler and the second conductive filler is magnetic.

\* \* \* \* \*